June 10, 1941.     H. O. COLE     2,245,101
HOSE NIPPLE CONNECTION AND JOINT
Filed Dec. 18, 1939
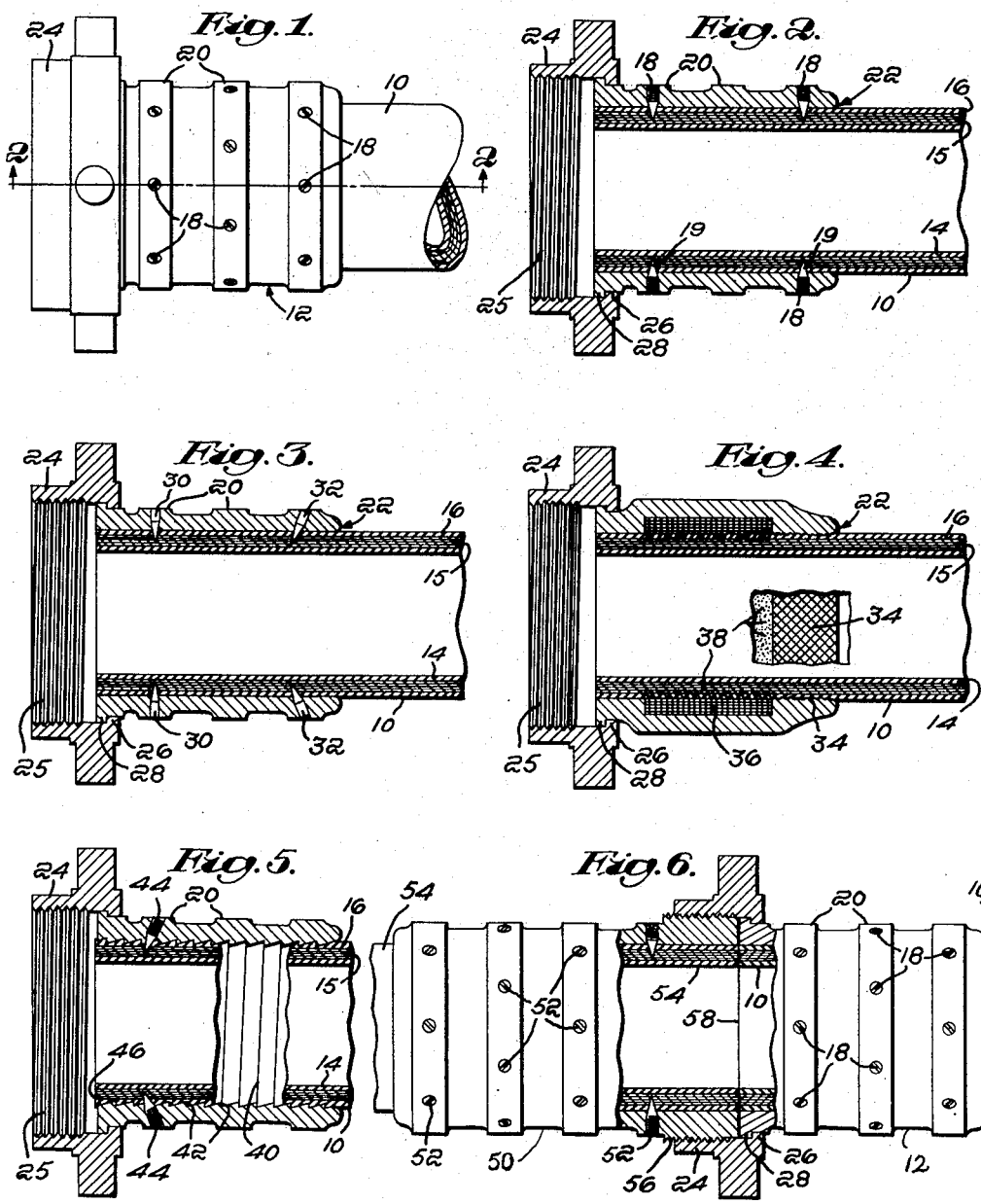
Inventor:
Harold O. Cole,
by Kenway & Witter
Attorneys Patented June 10, 1941

2,245,101

UNITED STATES PATENT OFFICE 2,245,101

HOSE NIPPLE CONNECTION AND JOINT

Harold O. Cole, Holliston, Mass., assignor to Boston Woven Hose & Rubber Company, Cambridge, Mass., a corporation of Massachusetts Application December 18, 1939, Serial No. 309,720

3 Claims. (Cl. 285—71)

This invention relates to hose nipple connections and joints and is particularly applicable to use in high pressure hose and hose used for grouting or for carrying abrasive materials. In various construction work, such as the driving of tunnels, grit and grout are conducted through hose to relatively inaccessible places. The conducting of these materials is either at relatively high velocity or at lower velocities and relatively higher pressures. In any event, considerable difficulty has been experienced at the stems or joints at the ends of the hose sections due to the smaller bore diameter thereat relative to the bore through the hose. For example, a hose having a 1½" inside diameter will have an inside diameter of about 1" at the stem or at any joint therein. This reduction in the bore results in increasing the velocity of the carried material about 50% at this point, and the resulting abrasive action causes undue wearing out of ordinary commercial stems and couplings. Stems of hardened steel with rubber linings have been employed and the greatest success has been achieved by increasing the size of the hose and couplings used. The building of the hose with enlarged ends for the purpose of securing a bore of uniform diameter throughout has been attempted but this solution has been found unsatisfactory due more particularly to the great difficulty of maintaining field repairs, especially where it is required to take the hose around sharp bends. One object of my invention is the production of a new and improved hose nipple connection which will eliminate this difficulty and provide a smooth and uniform bore throughout the length of the hose.

Whereas the ordinary hose stem or joint employs a nipple located within the bore of the hose, my improved hose connection employs a nipple constructed to receive the hose thereinto and means exteriorly of the bore of the hose for anchoring the nipple to the hose whereby eliminating any obstruction in or diminution of the bore passage through the hose. The nipple may be provided with means, such as sharp pins, penetrating the hose and acting to anchor the hose securely therein, it being particularly noted that the construction is such as to render the anchoring effect more secure as the hose is expanded by increased pressure. The end of the hose if furthermore located flush with or slightly beyond the corresponding end of the nipple and means are provided on the nipple for cooperating with the end of another hose section to join the two ends together with the ends of the hose bodies in abutting relation, whereby continuing the bore of the hose through the joint without diminution, obstruction or exposure of any portion of the nipple or joint to the bore passage and eliminating the necessity for washers. The production of an improved construction of this nature which provides the advantages above and hereinafter enumerated comprises a further object of the invention.

These and other features of the invention will be best understood and appreciated from the following description of preferred embodiments thereof selected for purposes of illustration and shown in the accompanying drawing in which, Fig. 1 is a side elevation of a hose end embodying my invention, Fig. 2 is a sectional view longitudinally therethrough, Figs. 3, 4, and 5 are like sectional views of modified forms of the invention, Fig. 6 is a side elevation, partially in longitudinal section, of a hose joint embodying the invention.

Referring first to Figs. 1 and 2 of the drawing, 10 indicates one end of a hose body and 12 a pipe-like nipple on and enclosing a portion of the end of the hose. The exterior cylindrical surface of the hose closely fits the interior cylindrical surface of the nipple and the end of the hose extends fully to and is substantially flush with the end of the nipple. The hose embodies an innermost tube 14, fabric plies 15 and an outer cover 16, and the hose and nipple are held in the assembled relation by pins 18 having sharp pointed ends 19 extending into the hose but not penetrating the innermost tube 14. The pins are screw-threaded into the nipple and the threads on the pins are preferably of the type adapted to cut corresponding threads in the nipple as the pins are driven to holding position. As illustrated in Fig. 1, the nipple may be provided with a plurality of relatively spaced annular ribs 20 and the pins are driven in alternate relation therethrough.

The object of the invention is so to attach the nipple to the hose that the bore through the hose is uniform throughout the length of the hose and nipple. It is noted that the pins 18 are located wholly exteriorly of the bore through the hose whereby leaving the bore of uniform diameter and providing a free full passage throughout its length. The pins thus maintain the assembly, and internal pressure within the hose causes even greater security by expanding the hose against the pins and internal wall of the nipple. The rear end of the nipple is preferably chamfered or rounded at 22 to eliminate any possibility of cutting into the hose during its use or upon pressure expansion thereof. Any suitable coupling can be provided on the nipple and I have herein illustrated a union 24 on and cooperating with the outer end of the nipple for this purpose, the union being threaded at 25 and having an annular shoulder 26 cooperating with an annular shoulder 28 on the nipple.

The construction illustrated in Fig. 3 is the same as that above described except for the pins 30 and 32. These pins are not threaded but are frictionally engaged within tight-fitting holes in the nipple. It may be desirable to mount some or all of the pins at a slight angle with the points thereof located more adjacent to the nipple end of the hose. The pins 32 are illustrated as being thus mounted. It will be apparent that these pins will be particularly effective in preventing separation of the hose and nipple longitudinally.

I desire it to be understood that in accordance with my invention the nipple can be secured to the hose by any suitable means which does not impair the full and free passage through the hose. The interior wall of the nipple may be roughened, as at 34 in Fig. 4 whereby better to grip the hose when pressure expands the hose into contact with such wall. The nipple may also have embodied interiorly therein a suitable hose gripping and holding means, such as a studded metallic sleeve or a plurality of layers 36 of stiff wire having stiff bristles 38 projecting therefrom inwardly of the bore and preferably directed toward the nipple end of the hose. Expansion of the hose causes the studs or bristles to penetrate into and hold the hose similarly to the pins above described and the roughened surface 34 further aids in providing a secure assembly.

It will furthermore be apparent that the nipple may be provided with integral teeth or the like at its bore for receiving and biting into the hose. These teeth may be in the form of a sharp thread cut into the nipple at and along its hose receiving bore. Such teeth or thread 40 are illustrated in Fig. 5. The teeth will preferably have points and shoulders 42 for penetrating into the hose and holding the hose and nipple from longitudinal separation. If desired, a limited number of pins 44 may also be used to supplement the holding teeth. Attention is also called to the position of the hose end which may be located slightly beyond the flush end of the nipple, as at 46, whereby to form a secure abutting joint with the end of a cooperating hose section, as hereinafter described. In any case the ends of the hose portions covered by the nipples are substantially commensurate with the corresponding ends of the nipples whereby the nipples support such hose portions against expansion to said ends and the hose ends are brought together into abutting and sealing contact when the coupling is tightened, as illustrated in Fig. 6.

In Fig. 6 I have illustrated two sections of hose provided with my improved nipple and joined together in end to end relation. The nipple 50 is secured to the hose 54 by pins 52 and is substantially the same as the construction shown at 10—12 except that an external thread is provided at 56 for cooperating with the internal thread 25 on the rotary coupling 24. The ends of the two hose sections 10 and 54 are in abutting relation and are so located relative to the corresponding ends of the nipples that, when the ends of the nipples are drawn tightly together, the abutting ends of the two hose sections are in substantial sealed contact at 58, thus providing a joint in which the bore through the hose is neither diminished nor obstructed and in which only the internal lining of the hose is exposed to the bore.

It will now be apparent that my improved nipple makes possible a full-bored and fully efficient coupling at the ends of hose sections and eliminates the objectionable restrictions and highly destructive wear at the joints of hose heretofore known. Furthermore, the nipple construction is so relatively simple that it is adapted not only to convenient assembly with the hose at the factory but also to replacement and repair purposes in the field by such simple tools as hammer and screw driver. The coupling is also particularly adapted to high pressure hose service since pressure within the hose serves to expand the hose wall outwardly into closer contact with the nipple and thereby into even greater holding relationship. The full-bore passage throughout the length of the hose provides the maximum of efficiency as will be understood and the elimination of the necessity for washers and metal surfaces at the bore further increases the efficiency and durability of the hose, it being particularly noted that exposure only of the hose lining 14 in continuous line at the bore passage especially adapts the hose to the transferring of acids, abrasive materials, etc. Attention is furthermore directed to the exterior of the nipple which is free of projecting clamps and the like commonly employed in hose couplings.

Having thus described my invention what I claim as new and desire to secure by Letters Patent of the United States is,

1. A nipple connection for hose, comprising in combination an annular pipe-like nipple having a cylindrical hose receiving bore, a hose body having one end extending into the bore and having its outer cylindrical surface supported on the cylindrical wall of the bore, the outer end of the nipple being substantially commensurate with the corresponding end of the hose whereby the nipple provides the sole supporting means for holding the hose against expansion to said end, means carried by the nipple and penetrating into the hose body to anchor the body to the nipple, and means on the outer end of the nipple for cooperating with a like and complemental nippled end of another hose body to join the two ends together with the ends of the hose bodies in aligned abutting relation and the bores thereof joined without obstruction or decrease in diameter at the joint.

2. A nipple connection for hose, comprising in combination an annular pipe-like nipple having a cylindrical hose receiving bore, a hose body having one end extending into the bore and having its outer cylindrical surface supported on the cylindrical wall of the bore, the hose embodying an innermost rubber tube supported exteriorly by fabric plies and the outer end of the nipple being substantially commensurate with the corresponding end of the hose whereby the nipple provides the sole supporting means for holding the hose against expansion to said end, pins carried by the nipple and having sharp inner ends penetrating into the fabric plies but not through the innermost tube, and means on the outer end of the nipple for cooperating with a like and complemental nippled end of another hose body to join the two ends together with the ends of the hose bodies in aligned abutting relation and the bores thereof joined without obstruction or decrease in diameter at the joint.

3. A hose joint comprising cooperating end portions of two sections of hose of uniform bore and diameter throughout the lengths of said portions, two annular pipe-like nipples respectively on and supporting said end portions at their outside surfaces, means anchoring the nipples to said end portions, the outer ends of said hose portions being substantially commensurate with the corresponding ends of the nipples whereby the nipples provide the sole supporting means for holding the hose against expansion to said ends, and means carried by the nipples and holding the hose ends in abutting relation at the joint.

HAROLD O. COLE.